US008525812B2

(12) United States Patent
Tanaami

(10) Patent No.: US 8,525,812 B2
(45) Date of Patent: Sep. 3, 2013

(54) INPUT DEVICE USING TOUCH PANEL

(75) Inventor: Yoshikane Tanaami, Gunma (JP)

(73) Assignee: Shoei Co., Ltd., Isesaki-shi, Gunma (JP)

( * ) Notice: Subject to any disclaimer, the term of this patent is extended or adjusted under 35 U.S.C. 154(b) by 324 days.

(21) Appl. No.: 13/129,918

(22) PCT Filed: Nov. 16, 2009

(86) PCT No.: PCT/JP2009/069678

§ 371 (c)(1),
(2), (4) Date: May 18, 2011

(87) PCT Pub. No.: WO2010/064545

PCT Pub. Date: Jun. 10, 2010

(65) Prior Publication Data

US 2011/0221702 A1 Sep. 15, 2011

(30) Foreign Application Priority Data

Dec. 1, 2008 (JP) ................................ 2008-306784

(51) Int. Cl.
*G06F 3/045* (2006.01)

(52) U.S. Cl.
USPC .......................................... 345/174; 345/173

(58) Field of Classification Search
None
See application file for complete search history.

(56) References Cited

U.S. PATENT DOCUMENTS

2007/0262966 A1* 11/2007 Nishimura et al. ........... 345/173
2008/0007538 A1 1/2008 Kotera et al.
2010/0296027 A1* 11/2010 Matsuhira et al. ............. 349/96

FOREIGN PATENT DOCUMENTS

JP 11-312054 A 11/1999
JP 2005-242501 A 9/2005
JP 2007-316847 A 12/2007
JP 2008-070762 A 3/2008

OTHER PUBLICATIONS

International Search Report of PCT/JP2009/069678, mailing date Feb. 23, 2010.

* cited by examiner

*Primary Examiner* — Adam R Giesy
(74) *Attorney, Agent, or Firm* — Westerman, Hattori, Daniels & Adrian, LLP

(57) ABSTRACT

Provided is a touch panel including an analog switch area and a fixed switch area. An input device of the present invention includes: a touch panel; a case including an opening capable of housing the touch panel; a transparent resin film bonded to the top surface of the case; and an adhesive applied to the back surface of the transparent resin film in the opening. It is possible to make the case and the touch panel flush with each other, and accordingly to offer a seamless supporting structure by covering the top surfaces of the case and the touch panel with the transparent resin film. In addition, since the touch panel includes the analog switch area and the fixed switch area, it is possible to offer the input device which includes all the operation switches in the touch panel.

7 Claims, 12 Drawing Sheets

Prior Art

Prior Art

INPUT DEVICE USING TOUCH PANEL

This application claims priority from Japanese Patent Application Number JP 2008-306784 filed on Dec. 1, 2008, the content of which is incorporated herein by reference in its entirety.

BACKGROUND OF THE INVENTION

1. Field of the Invention

The present invention relates to an input device which uses a touch panel arranged on a display device such as a liquid crystal or organic electro-luminescent (EL) display device, the touch panel used to enter information by pressingly operating the touch panel with a finger or a stylus in response to contents displayed on the display device.

2. Description of the Related Art

As display devices, flat-panel display devices including liquid crystal display devices and organic EL display devices are used for numerous electronic appliances. A touch panel as an input device for such an electronic appliance is superimposed on a surface of a flat-panel display device, so that information is entered into the electronic appliance by touching the touch panel with a finger or the like in response to the display on the display device.

Such an input device using the touch panel often employs a structure in which a touch panel 104 is supported between a liquid crystal display 105 and a front panel 102 as well as a fixing frame 103, as shown in Japanese Patent Application Publication No. 2008-70762. As shown in FIG. 13, in this structure, the peripheral portion of the touch panel 104 is held by the front panel. For this reason, the front panel juts out in a frame-like shape, whereas the peripheral portion of the touch panel always needs to be superimposed on the front panel. Furthermore, operation switches S1 to S5, such as a power supply switch and control switches, are provided in the front surface of a lower side portion of the front panel 102.

In addition, as shown in Japanese Patent Application Publication No. 2005-242501, there is employed a structure in which a touch panel is supported on a portion of a case 205 around a window 251 by use of a two-sided adhesive tape 208. In this structure as well, as shown in FIG. 14, the case 205 itself juts out in a frame-like shape on the peripheral portion of the touch panel, whereas the peripheral portion of the touch panel always needs to be covered with the case 205.

Moreover, there has been so far no input device using a touch panel provided with both an area for displaying information and operation switches including a power supply switch.

In the conventional input device using a touch panel, as described above, the front panel or the case juts out in a frame-like shape on the peripheral portion of the touch panel, whereas the front surface of the touch panel is slightly set back from the front panel or the case. For this reason, the front panel or the case hinders the touch panel from being touched. A problem with the conventional input device is that, particularly when a marginal portion of the touch panel needs to be touched, an operation switch provided in the side portion of the front panel or the case may be operated by mistake.

Another problem with the conventional input device using a touch panel is that the touch-panel supporting structure imposes restriction on the design, because the front panel or the case inevitably juts out in a frame-like shape.

Yet another problem with the conventional input device using a touch panel is that: the boundary between the peripheral portion of the touch panel and the frame-shaped portion of the front panel or the case becomes soiled by finger grime and dust, and becomes dirty as the input device is used for a longer time.

Still another problem with the conventional input device using a tough panel is limitation on the size of the input device and latitude in the design of the surroundings of the input device, because the input device is designed based on the concept that a portion of the touch panel corresponding to each operation switch displayed on the liquid crystal display or the like is touched for an input operation, and is provided with other operation switches, which are different from the operation switch displayed on the liquid crystal display or the like, independently of the touch panel.

SUMMARY OF THE INVENTION

Accordingly, the present invention has been made in view of the above-described conventional problem. A first aspect of the present invention is an input device using a touch panel comprising: a touch panel including a fixed switch area fixedly provided in a predetermined position, and an analog switch area allowing a switch displayed on a display device to be turned on in accordance with information on X-axis and Y-axis positions; and an illumination film provided on the touch panel in such a way as to expose the analog switch area of the touch panel, and provided with a display mark in the fixed switch area, wherein in the analog switch area of the touch panel, a portion of the touch panel above the switch displayed on the display device is touched to perform input, and in the fixed switch area, the display mark is touched to perform input is performed by touching the display mark.

In addition, the present invention has a feature in that the touch panel is divided into the analog switch area and the fixed switch area.

A second aspect of the present invention is an input device using a touch panel comprising: a touch panel including a fixed switch area fixedly provided in a predetermined position, and an analog switch area allowing a switch displayed on a display device to be turned on in accordance with information on X-axis and Y-axis positions; an illumination film provided on the touch panel in such a way as to expose the analog switch area of the touch panel, and provided with a display mark in the fixed switch area; a case including an opening capable of housing the touch panel; a transparent resin film stuck to the case in such a way as to at least cover the opening; an adhesive for bonding the touch panel to a back surface of the transparent resin film; and a display device provided under the touch panel, wherein in the analog switch area of the touch panel, a portion of the touch panel above the switch displayed on the display device is touched to perform input, and in the fixed switch area of the touch panel, the display mark is touched to perform input.

In addition, the present invention has a feature in that the touch panel and the case are almost flush with each other.

Moreover, the present invention has a feature in that the opening is formed in almost the same size as the touch panel.

Further, the present invention has a feature in that the touch panel is supported by the transparent resin film with the adhesive interposed in between.

Furthermore, the present invention has a feature in that a UV-curable resin is used as the adhesive.

Additionally, the present invention has a feature in that the case is made of a resin, and the transparent resin film is bonded to the case except for the opening.

In addition, the present invention has a feature in that the illumination film is bonded to a top of the touch panel.

According to the present invention, it is possible to provide both operation switches of a type designed to be displayed on the liquid crystal display or the like and operation switches (such as the operation switch of the air conditioner in the case of an automobile) of a type designed not to be displayed on the liquid crystal display or the like in the single touch panel, because the analog switch area and the fixed switch area are provided in the touch panel. Accordingly, mechanical operation switches conventionally provided in the dashboard of an automobile can be included in the touch panel of the present invention, and can be collectively placed in the input device using the touch panel. Furthermore, the latitude in the design of the dashboard of an automobile can be enhanced greatly because almost all the mechanical operation switches conventionally provided in the dashboard of an automobile are included in the touch panel.

In addition, according to the present invention, it is possible to make the case and the touch panel, which includes the analog switch area and the fixed switch area, flush with each other. Accordingly, the present invention can realize a seamless supporting structure by covering the two front surfaces with the transparent resin film. Furthermore, the present invention can realize the supporting structure which is capable of firmly fixing the touch panel to the case without mechanical support using the conventional frame or the like because: the touch panel as a whole is fixed to the transparent resin film by use of the adhesive; and the transparent film is bonded and thus firmly fixed to the case.

Moreover, the present invention can eliminate the conventional frame-shaped supporting structure, and accordingly realize the design which gives an impression that the case itself is the touch panel.

Additionally, the present invention forms no gap between the touch panel and the case, thus prevents the entrance of dust and moisture from the outside, and enables the touch panel and the case to be cleaned simultaneously, because the front surface of the case and the front surface of the touch panel are seamlessly covered with the transparent resin film.

DESCRIPTION OF THE INVENTION

Figure 1:
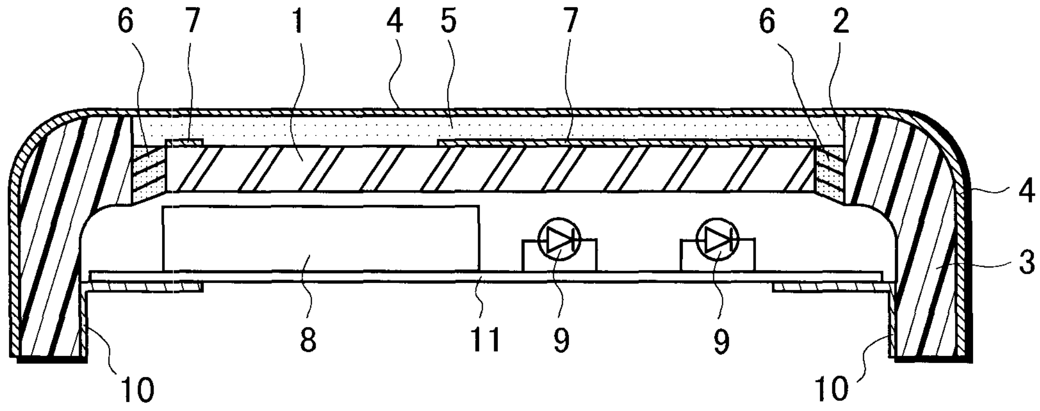
FIG. 1 is a cross-sectional view for explaining an input device using a touch panel of the present invention.

FIG. 1 shows a cross-sectional view for explaining an input device using a touch panel of the present invention.

The input device using a touch panel of this embodiment includes: a touch panel 1; a case 3 having an opening 2, and capable of containing the touch panel 1; a transparent resin film 4 bonded to the top surface of the case 3; an adhesive 5 applied to a portion of the back surface of the transparent resin film 4, which corresponds to the opening 2; an illumination film 7 bonded to the top surface of the touch panel 1; a display device 8 provided under the touch panel 1; and illumination devices 9.

As already known, the touch panel 1 is a member obtained by arranging an electrically-conductive electrode film on the inner surface of each of the two horizontally-long rectangular glass plates slightly larger than the liquid crystal display, and configured to function as an electrical switch when the electrically-conductive electrode films of the two respective glass plates are brought into contact with each other by touching the front surface of the touch panel 1 with a finger, a stylus or the like. A glass-glass structure or a film-glass structure is used for the touch panel. A resistor film, electrostatic capacity or ultrasound is used for the working of the touch panel.

The touch panel 1 of the present invention is provided with: an analog switch area configured to allow each of the switches displayed on the display device to be turned on in accordance with information on X-axis and Y-axis positions; and a fixed switch area fixedly provided in a predetermined position. Detailed descriptions will be provided for the touch panel by use of FIG. 2 later.

The case 3 is insertion-molded out of a polycarbonate resin. The opening 2 having almost the same horizontally-long rectangular shape as the touch panel 1 is provided at and around the center of the top surface of the case 3. The opening 2 is large enough to contain the touch panel 1, and only a slight gap is formed between the touch panel 1 and the case 3. The case 3 is colored mainly in black in order that the inside of the case cannot be seen through the case.

The transparent resin film 4 is formed from a highly-transparent polyester (polyethylene terephthalate (PET)) film with a thickness of approximately 500 μm, and is bonded to almost the rest of the case 3 in an overlapping manner while fully covering the opening 2 of the case 3. This structure supports and fixes the transparent resin film 4 to the top surface of the case 3, except for the opening 2. The transparent resin film 4 works as a surface reflection preventing film as well. Thus, the transparent resin film 4 prevents the reflection of the top surfaces of the case 3 and the touch panel 1 both covered with the transparent resin film 4.

The adhesive 5 made from the ultra-violet (UV)-curable resin for direct bonding is applied to the entirety of a portion of the back surface of the transparent resin film 4, which corresponds to the opening 2. Thereby, the entire front surface of the touch panel 1 is stuck to the transparent resin film 4. Accordingly, the touch panel 1 is fixed to the transparent resin film 4 with this adhesive 5. Consequently, the structure in which the touch panel 1 is supported by the case 3 with an assistance of the transparent resin film 4 is realized. It should be noted that: an adhesion UV resin 6 is filled in the gap between the touch panel 1 and the case 3, and fixedly bonds the touch panel 1 to the case 3; and accordingly, the touch panel 1 is fixedly supported by the case 3 with the adhesive 5 and the adhesion UV resin 6.

The illumination film 7 is formed from a PET film with a thickness of approximately 125 μm. A horizontally-long rectangular opening through which to expose the analog switch area of the touch panel 1 is provided in the illumination film 7. In addition, display marks are provided in the fixed switch area. The illumination film 7 is stuck to the top surface of the touch panel 1 with an optically-clear adhesive (OCA) film which is formed in the same shape as the illumination film 7.

The display device 8, for example, a liquid crystal display is attached to a supporting board 11, such as a printed board. Thereby, the display device 8 is fixed immediately under the analog switch area of the touch panel 1 by attaching the supporting board 11, to which the display device 8 is attached, to the case 3 by use of attachment metal fittings 10 provided to the case 3. Incidentally, instead of the liquid crystal display, another flat-panel display such as an organic EL display may be used as the display device 8. In addition, the illumination devices 9 are arranged on the above-mentioned supporting board 11, corresponding to the respective fixed switches immediately under the fixed switch area of the touch panel 1. Light-emitting diodes (LEDs) are used as the respective illumination devices 9. However, liquid crystal displays may be substituted for the LEDs.

According to such an input device using a touch panel, mechanical operation switches, which are conventionally provided in the dashboard of an automobile, can be included in the touch panel 1, because the input device uses the touch panel 1 which includes the analog switch area and the fixed switch area. Thereby, the input device using a touch panel can eliminate the conventional mechanical operation switches, and can create a design for the dashboard of an automobile by use of the touch panel of the present invention.

Moreover, the input device using a touch panel can make the case 3 and the touch panel 1 flush with each other, and accordingly can realize a seamless supporting structure by covering the two top surfaces with the transparent resin film 4. Thereby, the input device using a touch panel can achieve a breakthrough in innovating on the conventional frame-shaped supporting structure, and accordingly can create a design which gives an impression that the case 3 itself is the touch panel. Furthermore, the input device using a touch panel can prevent dust and moisture from entering the input device from the outside, and accordingly can clean the touch panel 1 and the case 3 at a time, because the touch panel 1 and the case 3 are covered with the transparent resin film 4.

Figure 2:
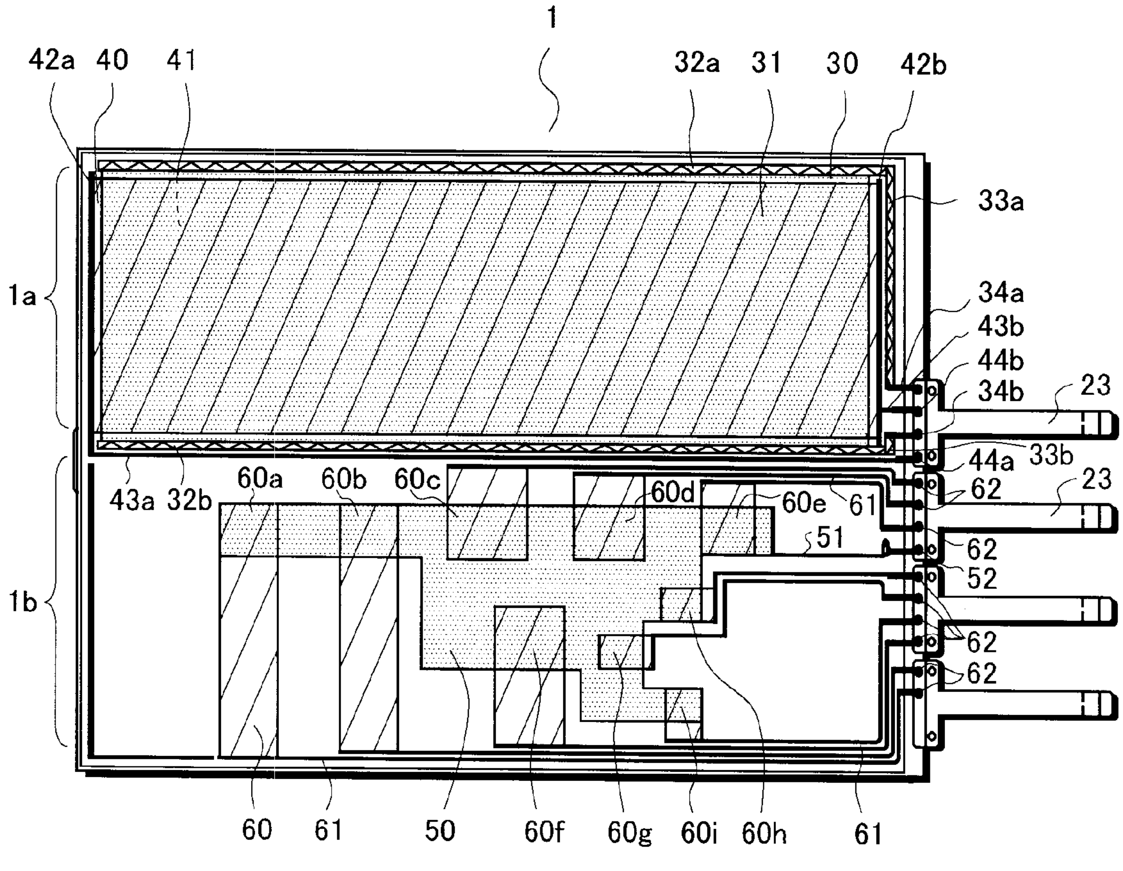
FIG. 2 is a diagram for explaining a touch panel of the input device using a touch panel of the present invention.

Next, descriptions will be provided for a structure of the touch panel 1 which includes the analog switch area and the fixed switch area by use of FIG. 2.

The touch panel 1 is divided into: an analog switch area 1*a* situated in its upper half; and a fixed switch area 1*b* situated in its lower half. The analog switch area 1*a* is an area allowing each switch displayed on the liquid crystal display 8 to be turned on in accordance with information on X-axis and Y-axis positions representing a touched portion of the touch panel 1. The fixed switch area 1*b* is an area allowing each fixed switch fixedly provided in the predetermined position on the touch panel 1 to be turned on when the corresponding fixed switch displayed on the illumination film 7 is touched.

As shown in FIG. 2, the analog switch area of the touch panel 1 includes: an upper substrate 30; a lower substrate 40; a transparent electrically-conductive film 31 formed on a given surface of the upper substrate, and a transparent electrically-conductive film 41 formed on a given surface of the lower substrate; two opposed Y-axis position detecting electrodes 32*a*, 32*b* formed on the upper substrate; two opposed X-axis position detecting electrodes 42*a*, 42*b* formed on the lower substrate; output electrodes 33, 43 formed on the upper and lower substrates, respectively; and externally-connected electrodes 34*a*, 34*b* of the upper substrate, and externally-connected electrodes 44*a*, 44*b* of the lower substrate.

A thin glass material is used for the upper substrate 30, and the transparent electrically-conductive film 31 is formed on the entirety of the given surface of the upper substrate 30, except for its peripheral end. The two Y-axis position detecting electrodes 32*a*, 32*b* for detecting a position in the Y-axis direction are provided along the upper and lower sides of the transparent electrically-conductive film 31. The Y-axis position detecting electrodes 32*a*, 32*b* are provided with routing electrodes 33*a*, 33*b* extending along perimeters of the upper substrate 30, respectively, and are connected to a given one of flexible leads 23 via the respective externally-connected electrodes 34*a*, 34*b*.

Like the upper substrate 30, a glass material is used for the lower substrate 40. The transparent electrically-conductive film 41 is formed on the entirety of the given surface of the lower substrate 40, except for its peripheral end. The two X-axis position detecting electrodes 42*a*, 42*b* for detecting a position in the X-axis direction are provided along the left and right sides of the transparent electrically-conductive film 41. The X-axis position detecting electrodes 42*a*, 42*b* are provided with routing electrodes 43*a*, 43*b* extending along perimeters of the lower substrate 40, respectively, and are connected to the given one of the flexible leads 23 via the respective externally-connected electrodes 44*a*, 44*b*.

The upper substrate 30 and the lower electrode 40 are bonded together by applying a sealing material, which is not illustrated, to the peripheral ends outside the Y-axis position detecting electrodes 32*a*, 32*b* and the X-axis position detecting electrodes 42*a*, 42*b* with the transparent electrically-conductive films 31, 41 opposed to each other. Thus, once an arbitrary point on the liquid crystal display 8 displayed in the analog switch area of the touch panel 1 is pressingly operated with a finger, a stylus or the like, the transparent electrically-conductive film 31 of the upper substrate 30 and the transparent electrically-conductive film 41 of the lower substrate 40 come into contact with each other in the arbitrary point. Accordingly, the transparent electrically-conductive films 31, 41 are put into an ON state. A value representing the resistance between the transparent electrically-conductive films is detected. Thereby, it is possible to know the X and Y coordinates of the arbitrary point. The information on the coordinates is transmitted to a central processing unit (CPU) via the output electrodes 33, 43, the externally-connected electrodes 34*a*, 34*b*, 44*a*, 44*b* and the given flexible lead 23. A process corresponding to the information on the coordinates is performed by the CPU.

It should be noted that, once the pressing operation is terminated, the transparent electrically-conductive film 31 of the upper substrate 30 and the transparent electrically-conductive film 41 of the lower substrate 40 are detached from each other, and are accordingly put into an OFF state. Thereby, the process corresponding to the information on the coordinates is terminated.

On the other hand, the fixed switch area of the touch panel 1 includes: an upper common switch electrode 50 formed on the upper substrate 30; mutually-independent lower fixed switch electrodes 60_a_, 60_b_, 60_c_, 60_d_, 60_e_, 60_f_, 60_g_, 60_h_, 60_i_ formed on the lower substrate 40, and electrically isolated from one another; a lead-out electrode 51 formed on the upper substrate 30; lead-out electrodes 61 formed on the lower substrate 40; and an externally-connected electrode 52 of the upper substrate and electrically-connected electrodes 62 of the lower substrates.

Incidentally, because the fixed switch area is formed in the same process as the analog switch area is formed, duplicated descriptions will be omitted.

The upper common switch electrode 50 is formed by etching the transparent electrically-conductive film 31 of the upper substrate 30 corresponding to the display marks provided in the illumination film 7. As shown in the drawing, portions of the upper common switch electrode 50 which overlap the lower fixed switch electrodes 60_a_, 60_b_, 60_c_, 60_d_, 60_e_, 60_f_, 60_g_, 60_h_, 60_i_ function as switches, respectively. In addition, an Ag pattern wire is provided in a peripheral end of the upper substrate 30 which is close to the leads, and the lead-out electrode 51 is thus provided in the peripheral end of the upper substrate 30. The lead-out electrode 51 is connected to another flexible lead 23 via the externally-connected electrode 52.

Similarly, the lower fixed switch electrodes 60_a_, 60_b_, 60_c_, 60_d_, 60_e_, 60_f_, 60_g_, 60_h_, 60_i_ are formed by etching the transparent electrically-conductive film 41 of the lower substrate 40 corresponding to the display marks, respectively. Ag pattern wires are provided to the extended portions of the lower fixed switch electrodes 60_a_, 60_b_, 60_c_, 60_d_, 60_e_, 60_f_, 60_g_, 60_h_, 60_i_, and the lead-out electrodes 61 are thus provided to the extended portions thereof. The lower fixed switch electrodes 60_a_, 60_b_, 60_c_, 60_d_, 60_e_, 60_f_, 60_g_, 60_h_, 60_i_, are connected to their corresponding flexible leads 23 via the corresponding externally-connected electrodes 62.

Furthermore, the upper common switch electrode 50 and each of the lower fixed switch electrodes 60_a_, 60_b_, 60_c_, 60_d_, 60_e_, 60_f_, 60_g_, 60_h_, 60_i_ are opposed to each other. Once one of the fixed switches displayed in the fixed switch area of the touch panel 1 is pressingly operated with a finger, a stylus or the like, the transparent electrically-conductive film 31 of the upper common switch electrode 50 and a portion of the transparent electrically-conductive film 41, which corresponds to a lower fixed switch electrode 60 of the operated fixed switch, come into contact with each other, and are put into the ON state. Incidentally, once the pressing operation is terminated, the transparent electrically-conductive films 31, 41 are detached from each other, and are thus put into the OFF state. These ON and OFF signals are transmitted to the CPU of the input device via the corresponding flexible leads 23. Accordingly, control is performed with respect to the corresponding fixed switch.

It should be noted that: the analog switch area and the fixed switch area may be respectively arranged in the left and right halves of the touch panel, and vice versa; or the analog switch area and the fixed switch area may be respectively arranged in the middle and marginal portions of the touch panel.

Figure 3A:
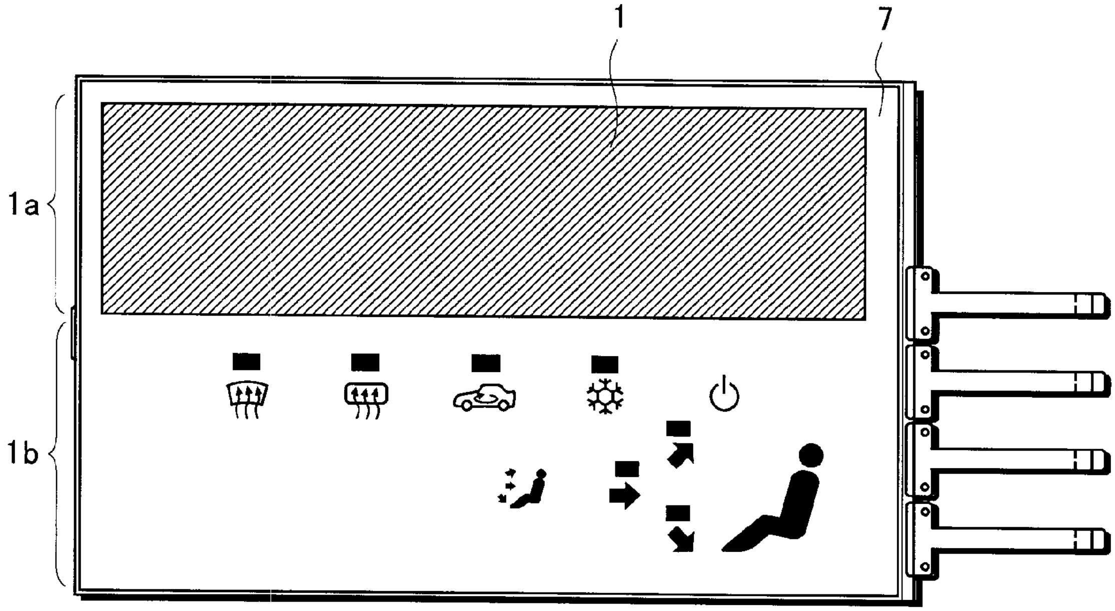
FIGS. 3A and 3B are diagrams for explaining an illumination film of the input device using a touch panel of the present invention.
Figure 3B:
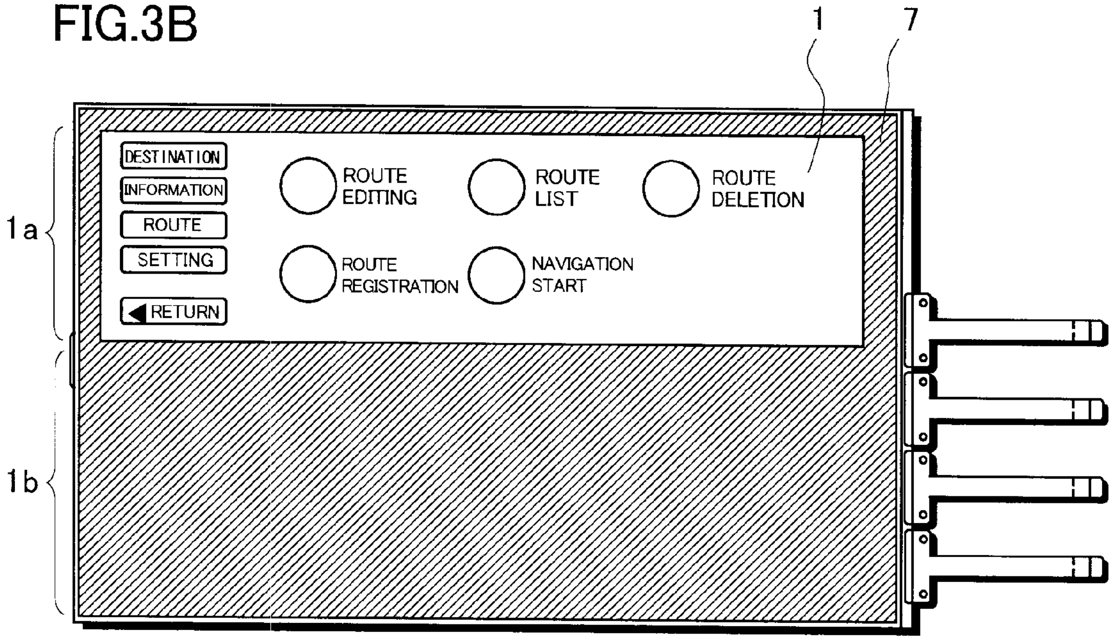

Detailed descriptions will be provided for how the illumination film 7 is used by use of FIGS. 3A and 3B. FIG. 3A is a diagram for explaining a state in which only the fixed switch area is displayed, and FIG. 3B is a diagram for explaining a state in which only the analog switch area is displayed.

As shown in FIG. 3A, the illumination film 7 is formed in almost the same size as the touch panel 1, and a display window which is almost the same size as the analog switch area is provided in a position matching the analog switch area. The illumination film 7 is stuck to the top surface of the touch panel 1 by use of the adhesive film. Once the illumination devices 9 provided under the touch panel 1 is lit, the display marks appear on the illumination film 7. While the illumination devices 9 are not lit, nothing is displayed.

To put it specifically, from the right in the upper row in FIG. 3A, the display marks represent a power supply switch (corresponding to reference numeral 60_e_ in FIG. 2), an air conditioner switch (corresponding to reference numeral 60_d_ in FIG. 2), a compartment air circulation switch (corresponding to reference numeral 60_c_ in FIG. 2), a windshield defrost switch (corresponding to reference numeral 60_b_ in FIG. 2) and a rear window defrost switch (corresponding to reference numeral 60_a_ in FIG. 2). In the lower right, the display marks represent air outlet selector switches (corresponding to reference numerals 60_g_, 60_h_, 60_i_) and an amount-of-air selector switch (corresponding to reference numeral 60_f_). Once any one of the display marks on the touch panel 1, which correspond to these fixed switches, is touched, a corresponding fixed switch functions. Once any one of the fixed switches is pressed, a display mark in green (whose color can be selected arbitrarily) appears when put into the ON state, and thereby indicates that the corresponding apparatus is switched on.

In addition, as shown in FIG. 3B, information displayed on the display device 8, for example, a car navigation route edition screen in this case is displayed in the analog switch area. This display operation is performed in the same manner as is performed in the touch panel used for the conventional car navigation system.

Figure 4:
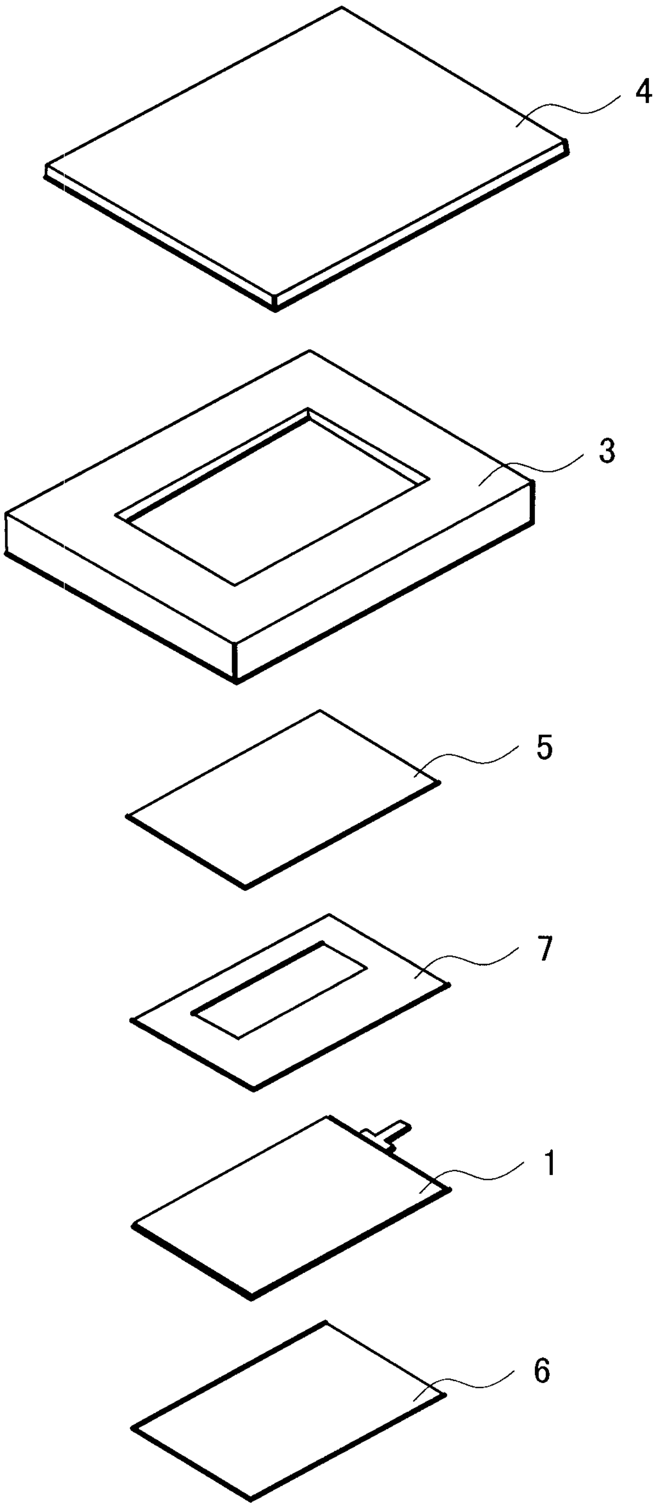
FIG. 4 is an exploded perspective view for explaining the input device using a touch panel of the present invention.

FIG. 4 shows an exploded perspective view for explaining a supporting structure of the touch panel of the present invention.

The highly-transparent resin film 4 is placed in the topmost portion of the touch panel. Under the transparent resin film 4, the black case 3 molded out of the polycarbonate resin is placed; the adhesive 5 made of the UV-curable resin for direct bonding is placed, the adhesive 5 applied to a portion of the back surface of the highly-transparent resin film 4, the portion situated in the opening 2 of the case 3; and the illumination film 7 bonded to the top surface of the touch panel 1 by use of the optically-clear adhesive film is placed. Under the illumination film 7, the touch panel 1 is placed, as well as the adhesion UV resin 6 filled in the gap between the touch panel 1 and the case 3 is placed.

In this supporting structure, the touch panel 1 and the case 3 can be integrally handled, and thus electronic appliances such as the car navigation system and a cellular phone can be assembled with a smaller number of parts. Accordingly, this supporting structure is useful to simplify the assembling process. In addition, this structure also enables the touch panel manufacturer to attach the touch panel 1 to the case 3, and thereafter to supply the thus-assembled touch panel 1 to the electronic appliance manufacturer. Moreover, because this supporting structure allows the touch panel manufacturer to conduct a product test once attaching the touch panel 1 to the case 3, this supporting structure eliminates process failure due to the assembling of the touch panel 1 with the case 3.

Next, descriptions will be provided for a manufacturing method of the present invention by use of FIGS. 5 to 12.

First of all, the manufacturing method includes: a step of molding the case 3; a step of sticking the touch panel 1 to the transparent resin film 4; a step of bonding the touch panel 1 and the case 3 together; and a step of bonding the case 3 and the illumination film 7 together.

The step of molding the case 3 will be described while referring to FIGS. 5 to 10.

Figure 5:
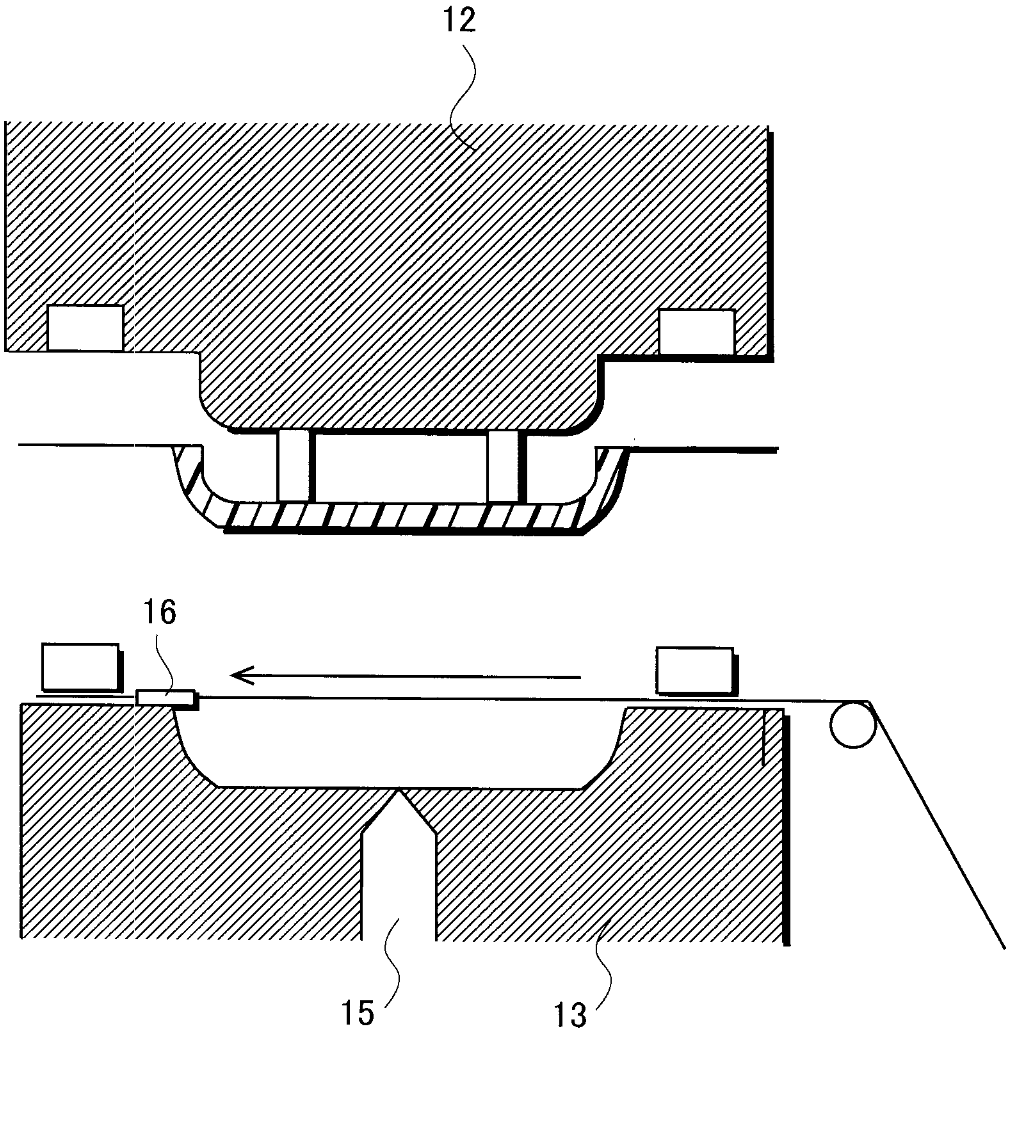
FIG. 5 is a cross-sectional view for explaining one of steps for manufacturing the input device using a touch panel of the present invention.

In FIG. 5, a cavity 14 (see FIG. 9) having a shape in which to mold the case 3 is formed by an upper mold 12 and a lower mold 13. An ejection port 15 through which to eject the resin is provided in the lower mold 13. The polycarbonate resin, which is heated, is injected into the cavity 14 through the ejection port 15. In FIG. 5, the transparent resin film 4 is supplied to the top surface of the lower mold 13 by a film feeding apparatus 16. Incidentally, the case 3 which has already been molded is held by the upper mold 12.

Figure 6:
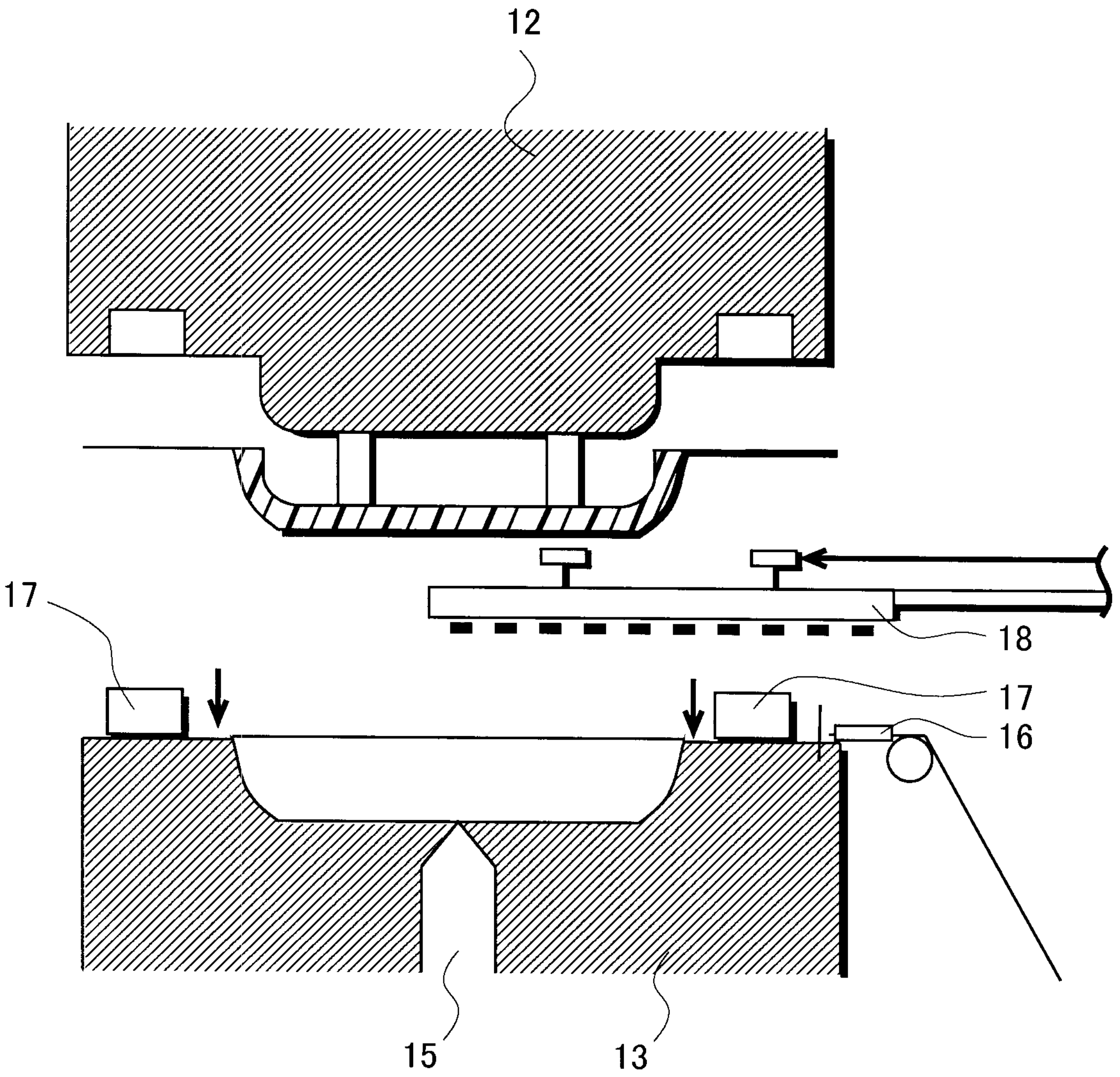
FIG. 6 is a cross-sectional view for explaining one of steps for manufacturing the input device using a touch panel of the present invention.

Subsequently, as shown in FIG. 6, the film feeding apparatus 16 cuts an end portion of the supplied transparent resin film 4 by heating with the end portion of the transparent resin film 4 held by a clamp 17 provided in the lower mold 13, and thereafter returns to its rest position. Simultaneously, a takeout robot 18 enters the space between the upper mold 12 and the lower mold 13 which are opened from each other.

Figure 7:
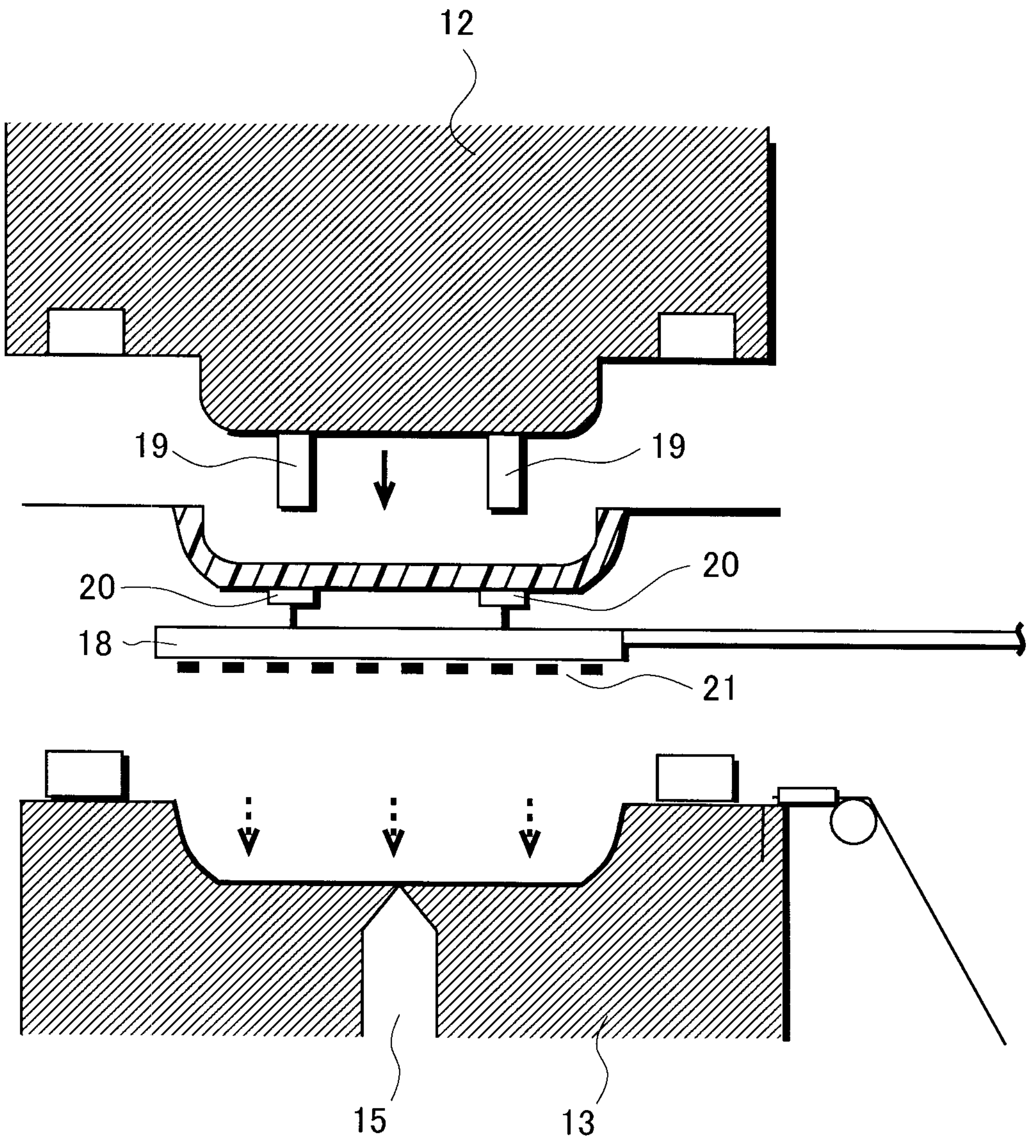
FIG. 7 is a cross-sectional view for explaining one of steps for manufacturing the input device using a touch panel of the present invention.

Afterward, as shown in FIG. 7, a molded component is separated from the upper mold 12 by use of an ejection turbine 19, and the molded component which becomes the case 3 is vacuumed by a vacuum chuck 20 provided on the top surface of the takeout robot 18. Simultaneously, the film comes into intimate contact with the surface of the lower mold 13 with the film heated by a heater 21 attached to the lower surface of the takeout robot 18 while the pressure is reduced through the ejection port 15.

Figure 8:
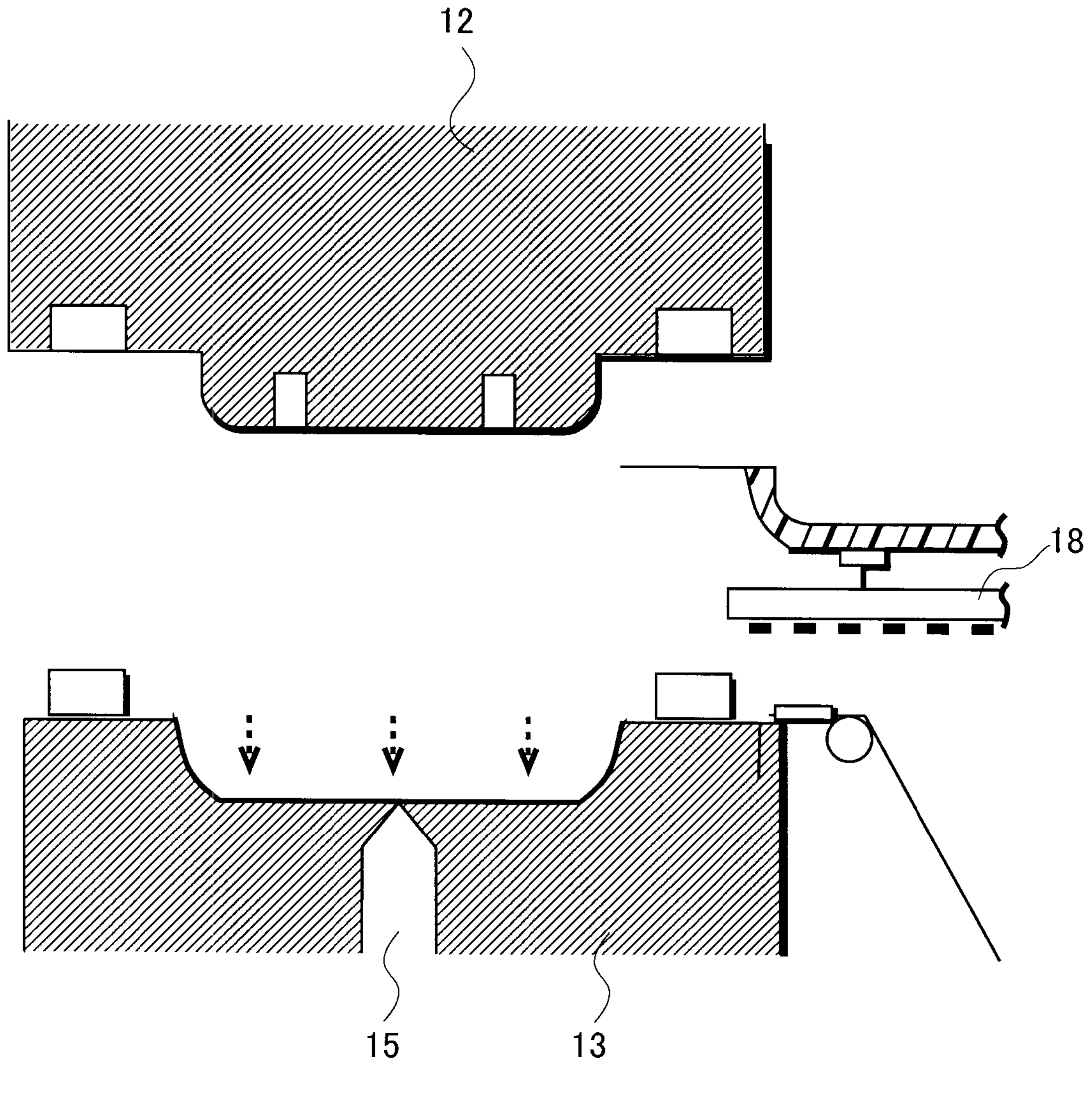
FIG. 8 is a cross-sectional view for explaining one of steps for manufacturing the input device using a touch panel of the present invention.

Subsequently, as shown in FIG. 8, the takeout robot 18 carries the molded component to the outside, and the ejection turbine 19 returns to the inside of the upper mold 12. Simultaneously, the molds start to be closed by causing the upper mold 12 to descend.

Figure 9:
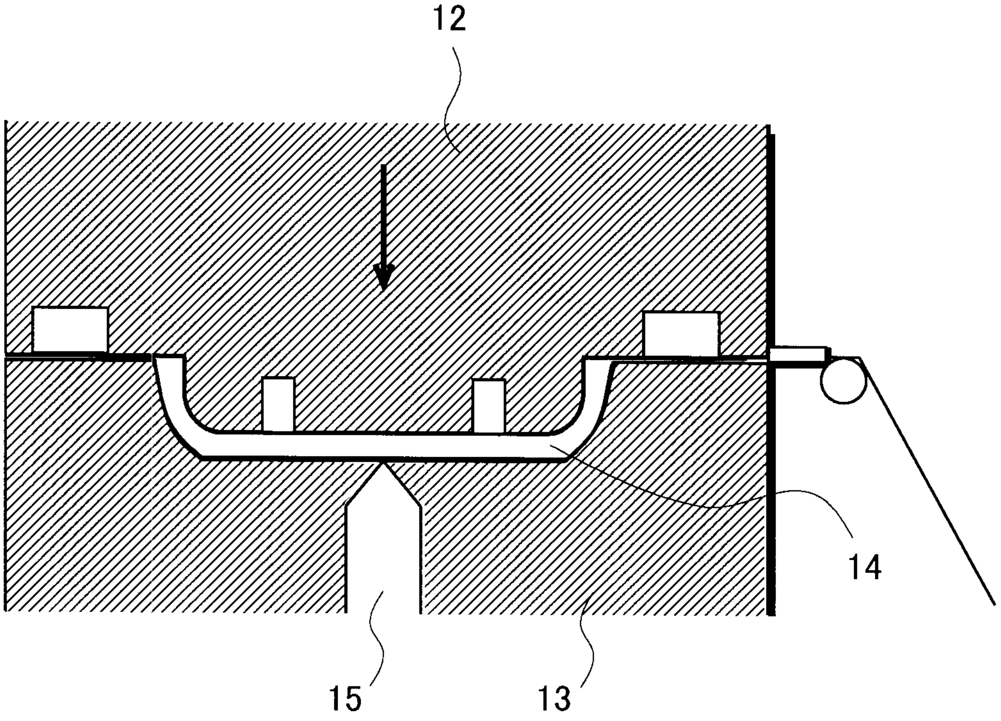
FIG. 9 is a cross-sectional view for explaining one of steps for manufacturing the input device using a touch panel of the present invention.

Thereafter, as shown in FIG. 9, once the two molds finish their closure, the cavity 14 having the molding shape is formed by the two molds. The polycarbonate resin, which is heated at 220° C., is ejected into and molded in the cavity 14 through the ejection port 15 under a dwell pressure of 100 Mpa with the two molds heated at 130° C. On this occasion, because a portion of the upper mold 12, which corresponds to the opening 2 of the case 3, is in intimate contact with the film, no portion of the polycarbonate resin is injected into the opening 2, and accordingly, the opening 2 is formed. As a result, the transparent resin film 4 covers the top surface of the molded component which becomes the case 3 and the opening 2, and the transparent resin film 4 is firmly bonded to the top surface of the case 3 by thermocompression bonding. The molding like this is termed as a "film insertion molding."

Figure 10:
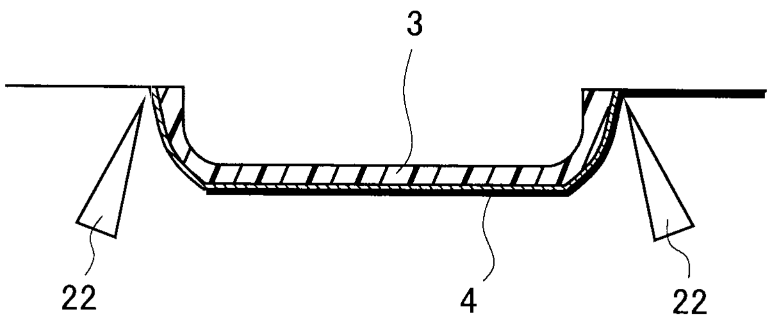
FIG. 10 is a cross-sectional view for explaining one of steps for manufacturing the input device using a touch panel of the present invention.

Finally, as shown in FIG. 10, unnecessary flash film portions are trimmed off from the outer periphery of the molded component, which is taken out of the two molds, by use of a cutter 22. Thereby, the case 3 to which the transparent resin film 4 is bonded is completed.

Figure 11:
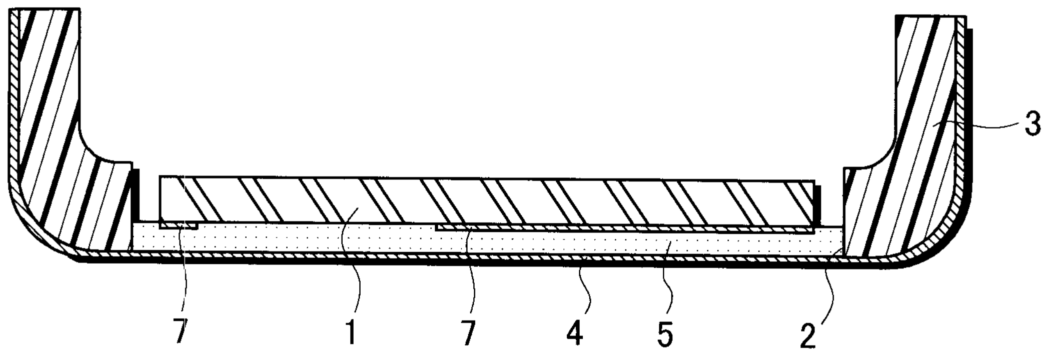
FIG. 11 is a cross-sectional view for explaining one of steps for manufacturing the input device using a touch panel of the present invention.
Figure 12:
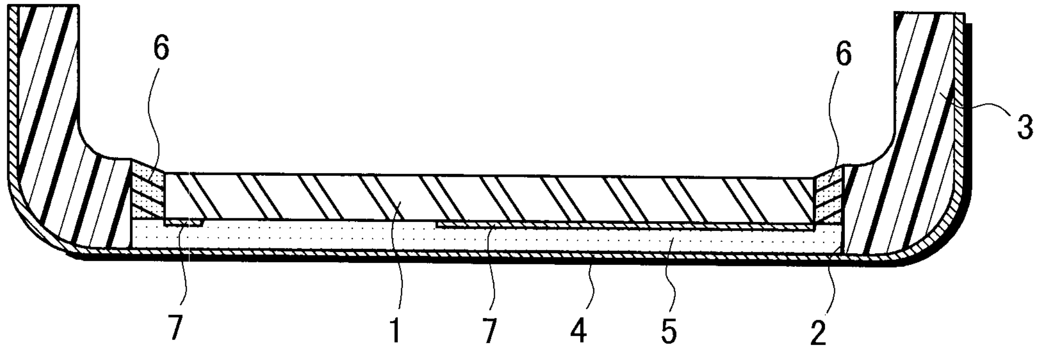
FIG. 12 is a cross-sectional view for explaining one of steps for manufacturing the input device using a touch panel of the present invention.
Figure 13:
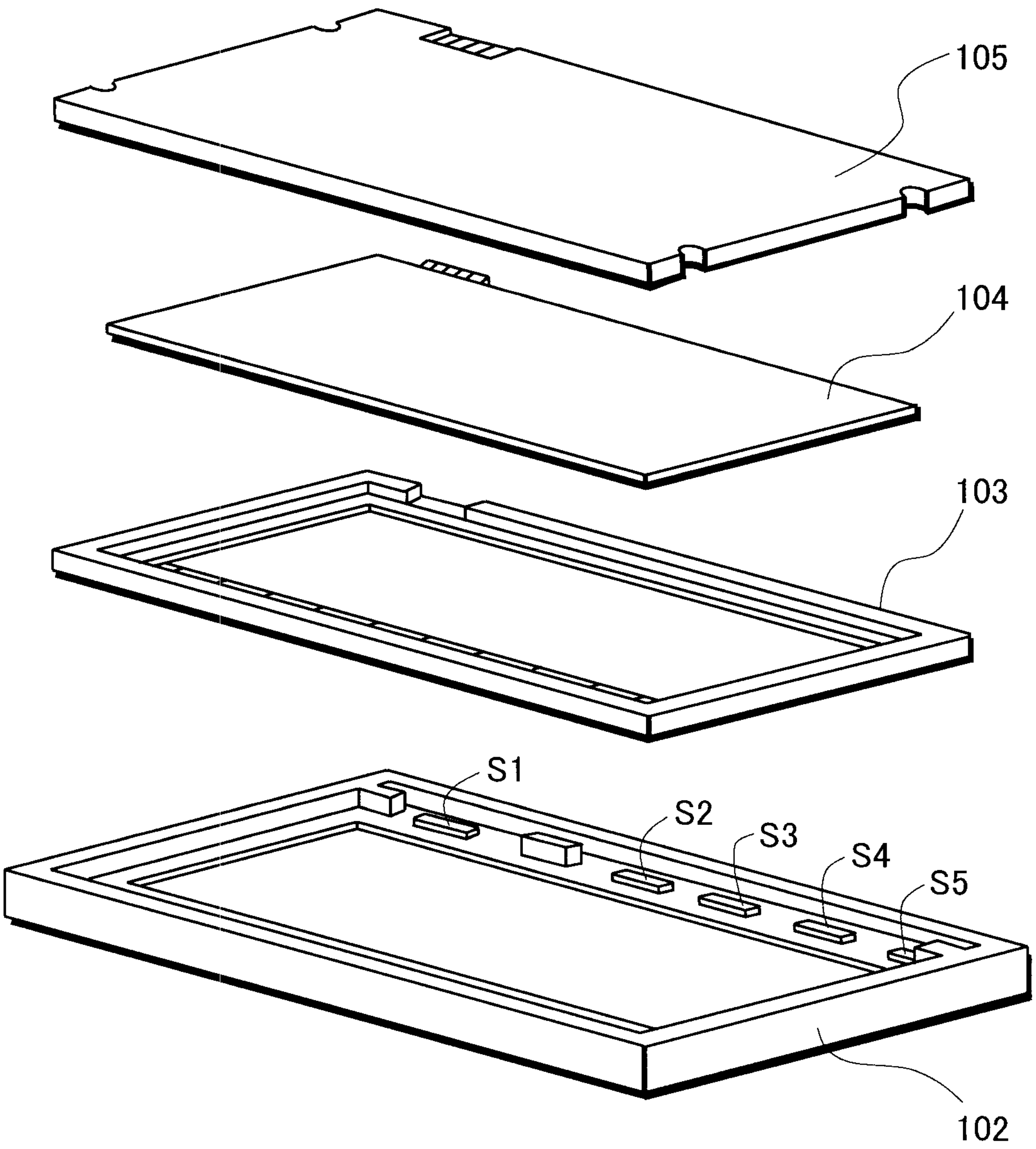
FIG. 13 is a diagram for explaining a supporting structure of a conventional touch panel.
Figure 14:
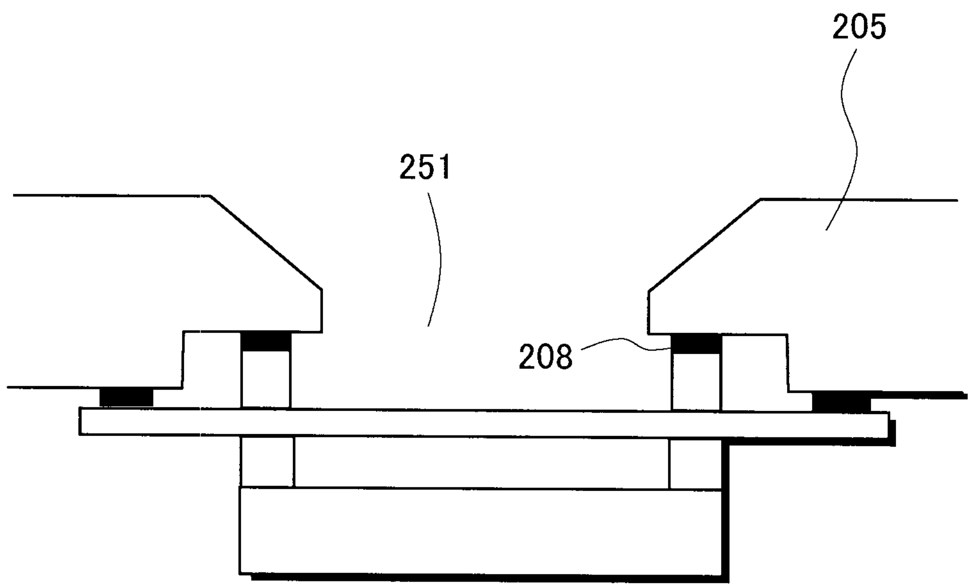
FIG. 14 is a diagram for explaining a supporting structure of a conventional touch panel.

Next, with reference to FIG. 11, descriptions will be provided for the step of sticking the touch panel 1 to the transparent resin film 4.

The case 3 is turned upside down, and the transparent resin film 4 is located lower than the case 3. Subsequently, the adhesive 5 made of the UV-curable resin for direct bonding, which is fluidal, is applied to the back surface of the transparent resin film 4. Thereafter, the touch panel 1 to whose top surface the illumination film 7 is stuck is placed on the transparent resin film 4 inside the opening 2 with the front surface of the touch panel 1 faced toward the transparent resin film 4. Thereby, bubbles and the like, which exist between the touch panel 1 and the adhesive 5, are removed through the spaces between the opening 2 and the touch panel 1 under the deadweight of the touch panel 1. The adhering of the touch panel 1 may be achieved under a reduced pressure to remove bubbles more effectively. After the adhering of the touch panel 1 is completed, the adhesive 5 is cured by irradiating the adhesive 5 with ultraviolet light.

In this step, the adhering can be achieved by just placing the touch panel 1 inside the opening 2. Accordingly, this step eliminates the positioning work and the like for the touch panel 1, as well as enhances the working efficiency greatly.

Furthermore, descriptions will be provided for the step of bonding the touch panel 1 and the case 3 together while referring to FIG. 2.

The fluidal adhesion UV resin 6 is dropped into the space between the opening 2 of the case 3 and the touch panel 1 with the case 3 placed upside down. Thereafter, the adhesion UV resin 6 is cured by irradiating the adhesion UV resin 6 with ultraviolet light. Incidentally, the curing of the above-mentioned adhesive 5 and the curing of the adhesion UV resin 6 may be achieved at the same time.

The adhesion UV resin 6 firmly bonds the lateral surface of the touch panel 1 and the case 3 together, and is thus capable of firmly supporting the touch panel 1 and the case 3 as if the touch panel 1 and the case 3 are a unitary body. As a result, even though the back surface of the touch panel 1 is not supported by anything, the touch panel 1 is capable of functioning as the switch when the front surface of the touch panel 1 is touched with a finger or the like.

Thereafter, the attachment metal fittings 10 is attached to the case 3 to fix the supporting board 11. Thus, the display device 8 and the illumination devices 9 are installed.

What is claimed is:

1. An input device using a touch panel, comprising:

a touch panel including an analog switch area where a switch displayed on a display device is to be turned on in accordance with coordinate information on X-axis and Y-axis positions acquired by detecting a resistance value at a point where a transparent electrically-conductive film of an upper substrate and a transparent electrically-conductive film of a lower substrate are in contact with each other, and including a fixed switch area where an upper common switch electrode and a lower fixed switch electrode, which are fixedly provided in predetermined positions by etching the transparent electrically-conductive films of the upper substrate and the lower substrate, are to come into contact with each other to transmit an ON signal;

an illumination film provided on the touch panel in such a way as to expose the analog switch area of the touch panel, and provided with a display mark in the fixed switch area;

a case including an opening capable of housing the touch panel;

a transparent resin film stuck to a surface of the case;

an adhesive for bonding the touch panel to a back surface of the transparent resin film inside the opening; and the display device and an illumination device provided on a supporting board under the touch panel, and an adhesive for bonding each side surface of the touch panel and the opening of the case together by filling a gap therebetween, wherein in the analog switch area of the touch panel, a portion of the touch panel above the switch displayed on the display device is touched to perform input, and in the fixed switch area of the touch panel, a portion where the display mark exists is touched to perform input, the illumination device provided on the supporting board is lit in response to the ON signal, and the display mark in the illumination film appears.

2. The input device using a touch panel of claim 1, wherein the touch panel and the case are almost flush with each other.

3. The input device using a touch panel of claim 1, wherein the opening is formed in almost the same size as the touch panel.

4. The input device using a touch panel of claim 1, wherein the touch panel is supported by the transparent resin film with the adhesive interposed in between.

5. The input device using a touch panel of claim 1, wherein a UV-curable resin is used as the adhesive.

6. The input device using a touch panel of claim 1, wherein the case is made of a resin, and the transparent resin film is bonded to the case except for the opening.

7. The input device using a touch panel of claim 1, wherein the illumination film is bonded to a top of the touch panel.

* * * * *